US012453477B2

(12) United States Patent
Pahlevaninezhad et al.

(10) Patent No.: US 12,453,477 B2
(45) Date of Patent: Oct. 28, 2025

(54) ENDOSCOPIC IMAGING USING NANOSCALE METASURFACES

(71) Applicants:PRESIDENT AND FELLOWS OF HARVARD COLLEGE, Cambridge, MA (US); THE GENERAL HOSPITAL CORPORATION, Boston, MA (US); PARTNERS HEALTHCARE, Cambridge, MA (US)

(72) Inventors: Hamid Pahlevaninezhad, Cambridge, MA (US); Mohammadreza Khorasaninejad, Cambridge, MA (US); Yao-Wei Huang, Cambridge, MA (US); Zhujun Shi, Cambridge, MA (US); Melissa Suter, Cambridge, MA (US); Federico Capasso, Cambridge, MA (US)

(73) Assignees: PRESIDENT AND FELLOWS OF HARVARD COLLEGE, Cambridge, MA (US); THE GENERAL HOSPITAL CORPORATION, Boston, MA (US); PARTNERS HEALTHCARE, Cambridge, MA (US)

( * ) Notice: Subject to any disclaimer, the term of this patent is extended or adjusted under 35 U.S.C. 154(b) by 1068 days.

(21) Appl. No.: 16/772,644

(22) PCT Filed: Dec. 12, 2018

(86) PCT No.: PCT/US2018/065288
§ 371 (c)(1),
(2) Date: Jun. 12, 2020

(87) PCT Pub. No.: WO2019/118646
PCT Pub. Date: Jun. 20, 2019

(65) Prior Publication Data
US 2021/0068665 A1    Mar. 11, 2021

Related U.S. Application Data

(60) Provisional application No. 62/598,455, filed on Dec. 13, 2017.

(51) Int. Cl.
*A61B 5/00* (2006.01)
*A61B 1/00* (2006.01)
(Continued)

(52) U.S. Cl.
CPC ........ *A61B 5/0097* (2013.01); *A61B 1/00096* (2013.01); *A61B 1/00188* (2013.01);
(Continued)

(58) Field of Classification Search
CPC .............. A61B 5/0097; A61B 1/00096; A61B 1/00188; A61B 1/07; A61B 5/0066;
(Continued)

(56) References Cited

U.S. PATENT DOCUMENTS

| 7,023,558 | B2 * | 4/2006 | Fee ...................... A61B 5/0066 356/498 |
| 2002/0131139 | A1 * | 9/2002 | Mandella ........... A61B 1/00186 359/368 |

(Continued)

FOREIGN PATENT DOCUMENTS

WO    WO2017/176921 A1    10/2017

OTHER PUBLICATIONS

Khorasaninejad et al. 2016 Science 352 1190-1194 with supplemental materials pub.date Jun. 2016 (Year: 2016).*
(Continued)

*Primary Examiner* — Keith M Raymond
*Assistant Examiner* — Patrick M Mehl
(74) *Attorney, Agent, or Firm* — FOLEY & LARDNER LLP

(57) ABSTRACT

An endoscopic imaging device (e.g., a catheter) comprises a light-transmitting tubing, at least one optical fiber disposed
(Continued)

in the light-transmitting tubing, and at least one metalens. The metalens is optically coupled to the optical fiber and is configured to focus light from the optical fiber, through the light-transmitting tubing, and to a target point located outside of the light-transmitting tubing. The metalens includes a plurality of nanostructures. The nanostructures define a phase profile that corrects astigmatism caused by the light-transmitting tubing.

25 Claims, 9 Drawing Sheets

(51) Int. Cl.
*A61B 1/07* (2006.01)
*G01B 9/02001* (2022.01)
*G01B 9/02091* (2022.01)
*G02B 1/00* (2006.01)
*G02B 3/00* (2006.01)
*G02B 23/24* (2006.01)
*G02B 27/00* (2006.01)

(52) U.S. Cl.
CPC .............. *A61B 1/07* (2013.01); *A61B 5/0066* (2013.01); *A61B 5/0068* (2013.01); *G01B 9/02001* (2013.01); *G01B 9/02091* (2013.01); *G02B 1/002* (2013.01); *G02B 3/0087* (2013.01); *G02B 23/243* (2013.01); *G02B 27/0025* (2013.01); *A61B 1/00165* (2013.01); *G02B 2207/101* (2013.01)

(58) Field of Classification Search
CPC . A61B 5/0068; A61B 1/00165; A61B 5/0084; A61B 5/00; G01B 9/02001; G01B 9/02091; G02B 1/002; G02B 23/243; G02B 27/0025; G02B 2207/101
See application file for complete search history.

(56) References Cited

U.S. PATENT DOCUMENTS

| | | | |
|---|---|---|---|
| 2003/0001071 A1* | 1/2003 | Mandella | G01B 9/0209 |
| | | | 250/201.3 |
| 2010/0165134 A1* | 7/2010 | Dowski, Jr. | G02B 13/0085 |
| | | | 257/E31.127 |
| 2016/0228071 A1* | 8/2016 | Wang | A61B 5/339 |
| 2016/0299170 A1* | 10/2016 | Ito | G02B 23/26 |
| 2017/0045652 A1 | 2/2017 | Arbabi et al. | |
| 2017/0212285 A1* | 7/2017 | Arbabi | G02B 1/002 |
| 2017/0224286 A1* | 8/2017 | Sakamoto | A61B 5/7207 |

OTHER PUBLICATIONS

Ozdemir et al. 2017 Optics Comm. 401:46-53 ePub May 26, 2017 (Year: 2017).*
International Search Report and Written Opinion for corresponding International Patent Application No. PCT/US2018/65288, 9 pages.

* cited by examiner

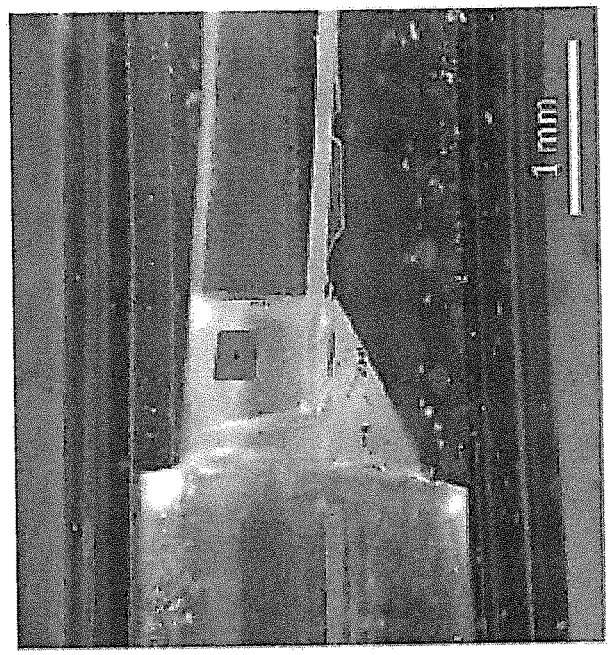
FIG. 2A
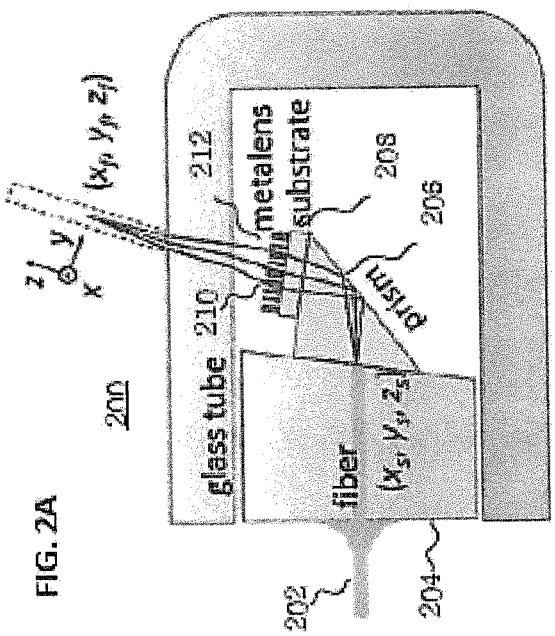
FIG. 2B
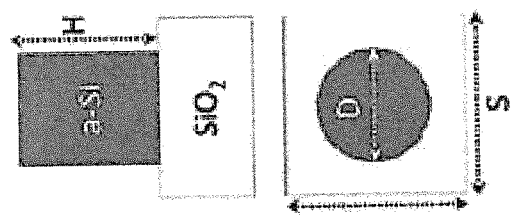
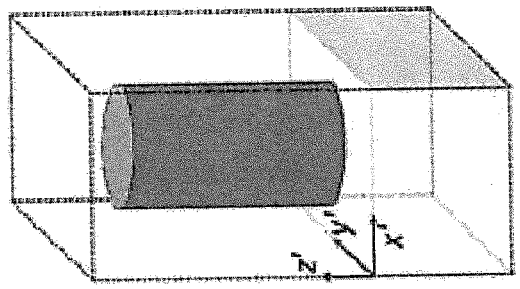
FIG. 2C

ENDOSCOPIC IMAGING USING NANOSCALE METASURFACES

CROSS-REFERENCE TO RELATED APPLICATIONS

This application is a National Stage Entry of International Application No. PCT/US2018/065288, filed on Dec. 12, 2018, which claims the benefit of and priority to U.S. Provisional Application No. 62/598,455, filed on Dec. 13, 2017, each of which is incorporated by reference herein in its entirety.

STATEMENT OF FEDERALLY SPONSORED RESEARCH OR DEVELOPMENT

This invention is made with Government support under R01CA167827 and R01HL133664 awarded by National Institute of Health and under FA9550-14-1-0389 and FA9550-16-1-0156 awarded by Air Force Office of Scientific Research. The Government has certain rights in the invention.

BACKGROUND

Endoscopic imaging using fiber optic catheters has provided opportunities for obtaining information from remote, hard-to-reach places in human bodies with several applications including biomedical imaging. In particular, endoscopic optical coherence tomography (OCT) that provides high-resolution imaging millimeters deep into the tissue allows obtaining diagnostic information about diseases in internal organs such as in coronary artery and pulmonary or gastrointestinal tracts. Moreover, given the vast majority of cancers in internal organs are originally epithelial, endoscopic OCT can be utilized for early diagnosis by using the endoscope inside the body.

Despite pressing clinical needs for tools and instruments capable of accurately visualizing extension of lesions in internal organs, shortcomings of volumetric endoscopic optical imaging techniques have prevented the techniques from being utilized in routine medical practices. For instance, confocal endomicroscopy provides desired contrast to differentiate tissue components but lacks the penetration depth and field of view required for obtaining reliable diagnostic information. On the other hand, comparative OCT provides depth information but comes short of desired contrast.

Furthermore, certain OCT catheters remain unaltered since early development stages of OCT. Generally, an optical field delivered through a single-mode fiber to the catheter distal end is redirected and focused on the tissue using either a graded-index (GRIN) lens or a ball lens. Images are captured when the optical beam is scanned on the sample through a transparent protective sheath using distal or proximal actuators. These designs of the OCT catheters have several shortcomings. Constraints in the shape of ball lenses and the index profile of GRIN lenses result in spherical aberrations and thus deviation from diffraction-limited focusing. In addition, the presence of multilayered structures in the optical path from the fiber facet to the focal point, unaccounted for in the lens design, degrades the focusing quality. For example, protective layers at the catheter distal end introduce significant astigmatism due to different curvatures parallel and perpendicular to the catheter axis. Also, the optical properties of an output beam such as polarization states and chromatic dispersion may not be controlled. These issues are not remedied in existing OCT catheters because the shape and refractive index profile of focusing elements are not readily adjustable.

SUMMARY

Optical aberrations impose significant limits on the resolving power of optical imaging catheters. Certain techniques to mitigate aberrations using compound refractive lenses are not suitable for the catheters due to size constraints and a complex optical path. A metalens, which can be an ultrathin planar lens including subwavelength-spaced scatterers (e.g., nanostructures) disposed across an interface with the ability to control incident light based on an arbitrary or selected phase profile, can be used to overcome the obstacles of aberration and astigmatism. By adjusting the geometrical parameters of nanoscale features of a metalens, any arbitrary phase profile can be achieved for focusing an incident light into a diffraction-limited spot. Thus, a metalens can be integrated into an OCT catheter to achieve focusing free of spherical aberration and astigmatism. Such an OCT system can achieve high-resolution ex vivo and in vivo endoscopic imaging. Furthermore, the metalens' chromatic dispersion property can be used to maintain high-resolution imaging beyond the input field Rayleigh range. An endoscopic system using the metalens can achieve small form-factor, straightforward fabrication, and versatile performances yield.

At least some embodiments of the present disclosure describe an imaging system with complementary features including imaging contrast superior to that of current techniques (e.g., sonography) and desired field-of-view and penetration depth. The disclosed imaging system facilitates the deployment of endoscopic optical imaging into routine medical practices. High resolution and high contrast imaging in an extended depth can revolutionize the diagnostic imaging of internal organs.

At least some embodiments of the present disclosure relate to fiber optic catheters using metalenses that include arrays of subwavelength-spaced optical scatterers at an interface. Depending on geometrical parameters and distribution, these optical scatterers locally shift the phase of the impinging light and shape the wavefront of the light. Due to the ability to tailor the phase, metalenses can reduce or minimize spherical aberrations and astigmatism, which can be barriers to diffraction-limited focusing and imaging. The technology can be used to achieve diffraction-limited focusing in various complex media with arbitrary refractive index profile and geometry. An OCT catheter integrated with a metalens can achieve diffraction-limited imaging in at least a millimeter depth range.

In one aspect of the present disclosure, an endoscopic imaging device includes a light-transmitting tubing, at least one optical fiber disposed in the light-transmitting tubing, and at least one metalens optically coupled to the optical fiber and configured to focus light from the optical fiber, through the light-transmitting tubing, and to a target point located outside of the light-transmitting tubing, wherein the metalens includes a plurality of nanostructures, and the nanostructures define a phase profile that corrects one or more aberrations including astigmatism caused by the light-transmitting tubing.

In some embodiments, the metalens is further configured to collect light from the target point outside of the light-transmitting tubing, through the light-transmitting tubing, and to the optical fiber.

In some embodiments, the phase profile of the nanostructures corrects one or more aberrations including astigmatism caused by tubing curvatures of the light-transmitting tubing parallel or perpendicular to a catheter axis.

In some embodiments, the phase profile of the nanostructures compensates length differences between a shortest optical path between the target point and a focal point of the metalens and an optical path between the target point and the focal point through the metalens.

In some embodiments, the endoscopic imaging device further includes a prism optically coupling the metalens to the optical fiber.

In some embodiments, the nanostructures include amorphous silicon nanopillars having an azimuthal symmetry.

In some embodiments, the nanostructures have a common height and various diameters and the phase profile depends on the diameters of the nanostructures.

In some embodiments, the nanostructures have a common height and various bases and the phase profile depends on the geometry of the nanostructures.

In some embodiments, the metalens is configured to output light with a specific polarization state.

In some embodiments, the metalens is configured to collect light with a specific polarization state.

In some embodiments, the endoscopic imaging device is a catheter of an endoscopic optical coherence tomography system, a confocal endomicroscope, or a two-photon imaging endoscope.

In some embodiments, the endoscopic imaging device is configured to extend an imaging depth-of-focus by modifying metalens dispersion.

In one aspect of the present disclosure, an endoscopic imaging system includes an interferometer, a detection unit coupled to the interferometer, and a catheter coupled to the interferometer. The catheter includes a light-transmitting tubing, an optical fiber disposed in the light-transmitting tubing, and a metalens optically coupled to the optical fiber and configured to focus light from the optical fiber, through the light-transmitting tubing, and to a target point located outside of the light-transmitting tubing. The metalens includes a plurality of nanostructures, and the nanostructures define a phase profile that corrects astigmatism caused by the light-transmitting tubing.

In some embodiments, the phase profile of the nanostructures corrects astigmatism caused by tubing curvatures of the light-transmitting tubing parallel or perpendicular to a catheter axis.

In some embodiments, the nanostructures comprise amorphous silicon nanopillars, and the phase profile depends on various diameters of the nanopillars.

In some embodiments, the endoscopic imaging system includes a fiber optic rotary joint coupling the catheter to the interferometer, the fiber optic rotary joint configured to control rotational and translational motions of the catheter.

In some embodiments, the endoscopic imaging system includes an acousto-optic optical modulator configured to control a depth degeneracy of the catheter.

In some embodiments, the detection unit includes at least one beam splitter and at least one balance detector.

In some embodiments, the endoscopic imaging system includes a wavelength-swept source coupled to the interferometer.

In one aspect of the present disclosure, a polarization-sensitive optic endoscopic system includes a first optical fiber, a second optical fiber, and a catheter coupled to the first optical fiber and the second optical fiber. The catheter includes a light-transmitting tubing, wherein a portion of the first optical fiber and a portion of the second optical fiber are disposed in the light-transmitting tubing, a first metalens optically coupled to the first optical fiber and configured to focus light of a first polarization state from the first optical fiber and to a target point located outside of the light-transmitting tubing, and a second metalens optically coupled to the second optical fiber and configured to focus light of a second polarization state from the second optical fiber and to the target point located outside of the light-transmitting tubing. The first metalens includes a plurality of first nanostructures, and the first nanostructures define a phase profile that focuses the light of the first polarization state to the target point. The second metalens includes a plurality of second nanostructures, and the second nanostructures define a phase profile that focuses the light of the second polarization state to the target point.

In some embodiments, the polarization-sensitive optic endoscopic system further includes a multiple-channel interferometer configured to introduce optical path delays for multiple channels.

In some embodiments, the polarization-sensitive optic endoscopic system further includes a frequency shifting component configured to provide acousto-optic frequency shifts for multiple channels.

In some embodiments, the first metalens is further configured to collect light of the first polarization state from the target point outside of the light-transmitting tubing and to the first optical fiber.

In some embodiments, the second metalens is further configured to collect light of the second polarization state from the target point outside of the light-transmitting tubing and to the second optical fiber.

In some embodiments, the first polarization state is a right-handed elliptical polarization state, and the second polarization state is a left-handed elliptical polarization state.

BRIEF DESCRIPTION OF THE DRAWINGS

For a better understanding of some embodiments of this disclosure, reference should be made to the following detailed description taken in conjunction with the accompanying drawings.

FIG. 2a illustrates a distal end of a metalens catheter, according to one or more embodiments of the present disclosure.

FIG. 2b illustrates a photographic image of a fabricated metalens catheter, according to one or more embodiments of the present disclosure.

FIG. 2c illustrates amorphous silicon nanopillars having an azimuthal symmetry deposited on a substrate, according to one or more embodiments of the present disclosure.

DETAILED DESCRIPTION

At least some embodiments of the present disclosure relate to fiber optic catheters including metalenses. Versatility and design flexibility of the metalens catheter provides for functionalities that are inaccessible using certain comparative techniques. Some embodiments provide for high-resolution endoscopic imaging by overcoming spherical aberrations and astigmatism, which can be barriers to diffraction-limited focusing. Such an endoscopic system can achieve optical imaging with a high resolving power that is superior to comparative biomedical imaging techniques such as sonography. Due to the high quality output beam and dispersion management, the metalens catheter can achieve high-resolution endoscopic imaging in vivo and/or ex vivo in an extended depth.

Metalens Catheter Design and Fabrication

Figure 1A:
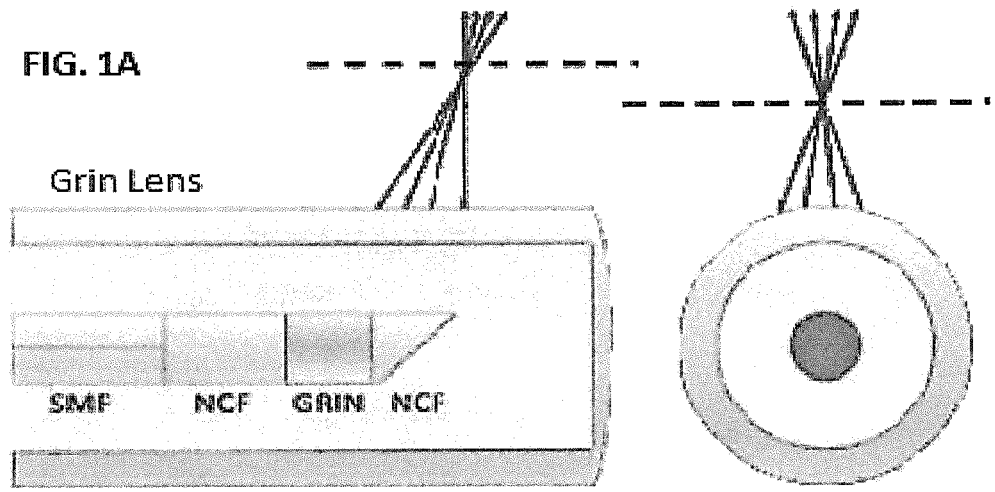
FIG. 1a illustrates an OCT catheter including a GRIN lens.
Figure 1B:
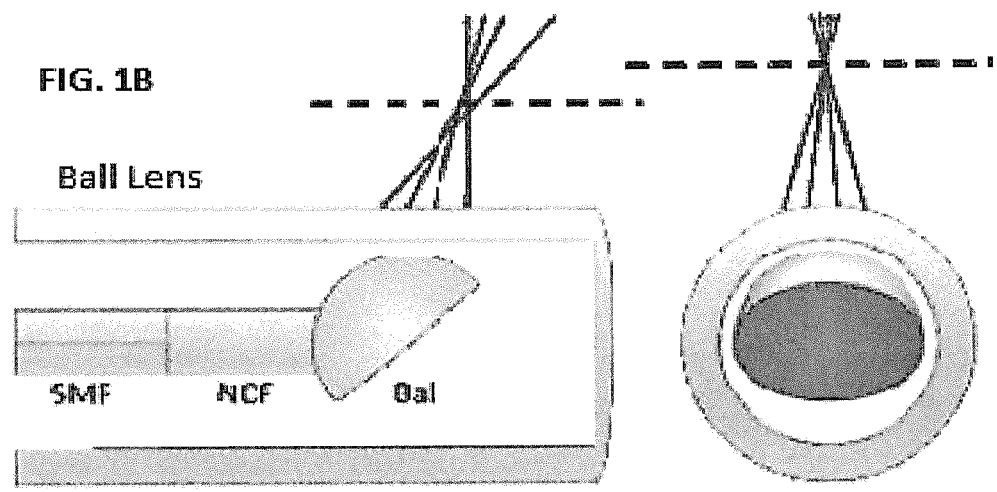
FIG. 1b illustrates an OCT catheter including a ball lens.
Figure 1C:
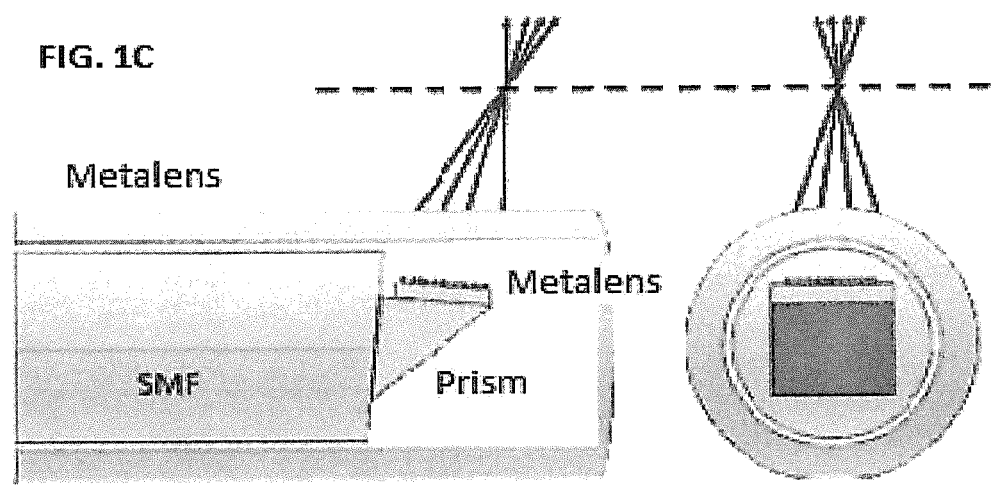
FIG. 1c illustrates an OCT catheter including a metalens, according to one or more embodiments of the present disclosure.

Comparative OCT catheters may suffer from drawbacks such as astigmatism. FIG. 1a illustrates an OCT catheter including a GRIN lens. FIG. 1b illustrates an OCT catheter including a ball lens. Optical field delivered through a single-mode fiber (SMF) and a no-cure filter (NCF) to the catheter distal end is redirected and focused on the tissue. Output beams of these catheters suffer from astigmatism mainly due to the presence of protective layers with different curvatures in the transverse plane. FIG. 1c illustrates an OCT catheter including a metalens. The metalens reduces or minimizes the astigmatism through diffraction-limited focusing by compensating for the effect of aberration-introducing protective layers.

FIG. 2a illustrates a distal end of a metalens catheter 200. As shown in FIG. 2a, light is transmitted and collected through a single mode fiber (SMF) 202 housed into a drive cable and a ferrule 204 with an 8° angle-polished end facet (other embodiments may implement a different end facet), which can help to reduce back-reflections. A prism 206 attached to the ferrule 204 redirects the light to the side toward the metalens 212. Thus, the catheter 200 is a side-viewing catheter suitable for imaging luminal organs, for example. A transmissive metalens 212 can be planar, can include amorphous silicon (a-Si) nanopillars 210 on substrate 208 (e.g., a substrate that includes glass, and/or a substrate that is about 170 micrometer (μm) thick, or has a thickness in a range of about 160 μm to about 180 μm, or in a range of about 150 μm to about 190 μm) focuses and collects light to and from a target object.

In some embodiments, the metalens may be fabricated using a top-down approach. A Si layer (e.g. a Si layer that is about 750 nanometer (nm) thick, or an Si layer having a thickness in a range of about 600 nm to about 800 nm, or in a range of about 550 nm to about 850 nm) is deposited on the substrate 208 using, for example, plasma-enhanced chemical vapor deposition (PECVD). The sample is diced into rectangular pieces (e.g. about 0.8 millimeter (mm) wide rectangular pieces, or rectangular piece that are in a range of about 0.7 mm wide to about 0.9 mm wide, or that are in a range of about 0.6 mm wide to about 1.0 mm wide) that are mounted on a larger substrate for spin-coating of a double layer (e.g. a Poly(methyl methacrylate) PMMA layer). An additional layer of conductive polymer is spin-coated prior to electron beam lithography (EBL), which can help to avoid charging effects. Nanopillar mask patterns may be defined using EBL followed by deposition of an aluminum layer (e.g. a 30 nm thick aluminum layer, or an aluminum layer having a thickness in a range of about 25 nm to about 35 nm, or in a range of about 20 nm to about 40 nm) by thermal evaporation and a lift off process. Inductively coupled plasma-reactive ion etching (ICP-RIE) may be used to etch nanopillar structures. Anisotropic etching may be conducted using a mixture of $SF_6$ and $CH_4$. The aluminum mask may be removed by immersing the sample in a developer (e.g. for about 5 minutes). The overall size of the fabricated metalens may be, for example, about 280 μm×280 μm, or about 290 μm×about 290 μm, or about 300 μm×about 300 μm.

FIG. 2b illustrates a photographic image of a fabricated metalens catheter. The optical components at the catheter distal end are assembled using custom built-alignment set-ups including holders for the metalens, fiber, and prism mounted on separate translational and rotational stages that provide for accurate alignment. The components are attached together by optical adhesive while the output beam is monitored and measured by a custom-built imaging system to ensure the optimized performance. A close-ended glass window tubing encapsulates the rotating parts of the distal end, preventing direct contacts between imaging targets and rotating optics as well as protecting the distal optics from contamination (e.g., blood in the field). The window tubing is an example of aberration-introducing layers, causing astigmatism owing to the different tubing curvatures parallel and/or perpendicular to the catheter axis. The astigmatism can be corrected by suitably designed metalens phase profile.

As shown in FIG. 2a, the metalens focuses light from the fiber facet (which can be considered as a point source) located at $(x_s, y_s, z_s)$ to a diffraction-limited spot at $(x_f, y_f, z_f)$, free of spherical aberrations and astigmatism. In some embodiments, the numerical aperture (NA) may be about 0.116 and the working distance (WD) may be about 0.5 mm. To reduce or minimize the spherical aberrations and astigmatism, the metalens defines the phase profile φ:

$$\varphi = \frac{2\pi}{\lambda_0}(L_{chief} - L_{sl} - L_{lf}), \quad (1)$$

to compensate for optical path length differences, where $L_{sl}$, $L_{lf}$ and $L_{chief}$ are point source-to-lens, lens-to-focal point, and chief ray (the shortest) optical path lengths, respectively, at a design wavelength (e.g., $\lambda_0=1.31$ µm). In some embodiments, an analytic approach can be used to determine the phase profile based on, for example, ray-tracing. Furthermore, metalens chromatic dispersion property may be designed such that the focal point shifts axially (on the chief ray) with wavelength variations.

In some embodiments, the metalens building blocks are amorphous silicon (a-Si) nanopillars with a same height (e.g. about 750 nm, or in a range of about 600 nm to about 800 nm, or in a range of about 550 nm to about 850 nm) but different diameters to locally impart the phase profile. FIG. 2c illustrates amorphous silicon nanopillars having an azimuthal symmetry deposited on a substrate. The substrate may be, for example, a cover glass substrate. In some embodiments, the nanopillars' height (H) may be about 750 nm (or in a range of about 600 nm to about 800 nm, or in a range of about 550 nm to about 850 nm) and the period of unit cells (S) may be about 400 nm (or in a range of about 350 nm to about 450 nm, or in a range of about 300 nm to about 500 nm). The azimuthal symmetry results in polarization-independent metalens, considering small range of incident angles. Thus, the metalens catheter is suitable for medical imaging application where light exiting the single mode fiber is randomly polarized due to frequent spinning and bending of the fiber during imaging.

Figure 3:
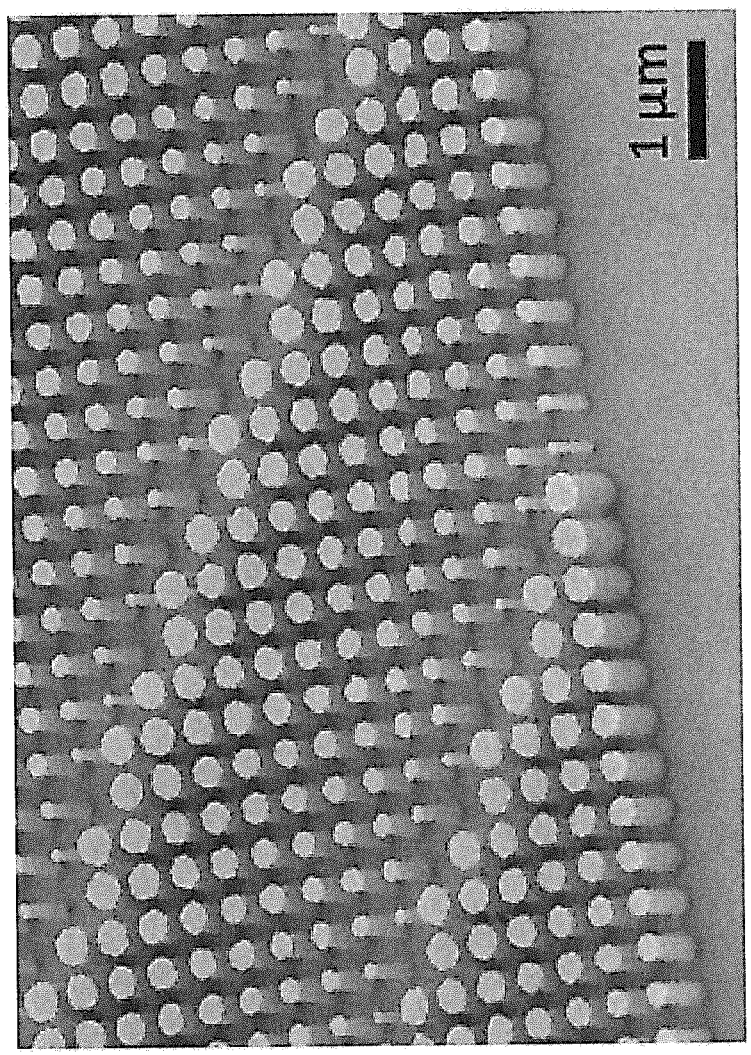
FIG. 3 illustrates a scanning electron microscope (SEM) image of a metalens fabricated by a top-down approach, according to one or more embodiments of the present disclosure.

Amorphous silicon has a high refractive index and a low absorption in near-infrared region, making amorphous silicon an appropriate material for nanopillars to form high efficiency metalenses for OCT systems. The a-Si high refractive index allows closely-packed nanopillars that fulfill a Nyquist sampling criterion $$\left(S < \frac{\lambda}{2NA}, \text{NA: numerical aperture, } S: \text{unit cell constant}\right)$$

with negligible near-field coupling. In some embodiments, nanopillars having larger than about 80% power transmittance (e.g. about 85% or more, or about 90% or more) may be selected for high efficiency performance. FIG. 3 illustrates a scanning electron microscope (SEM) image of a metalens fabricated by a top-down approach.

Metalens Catheter Characterization.

Figure 4:
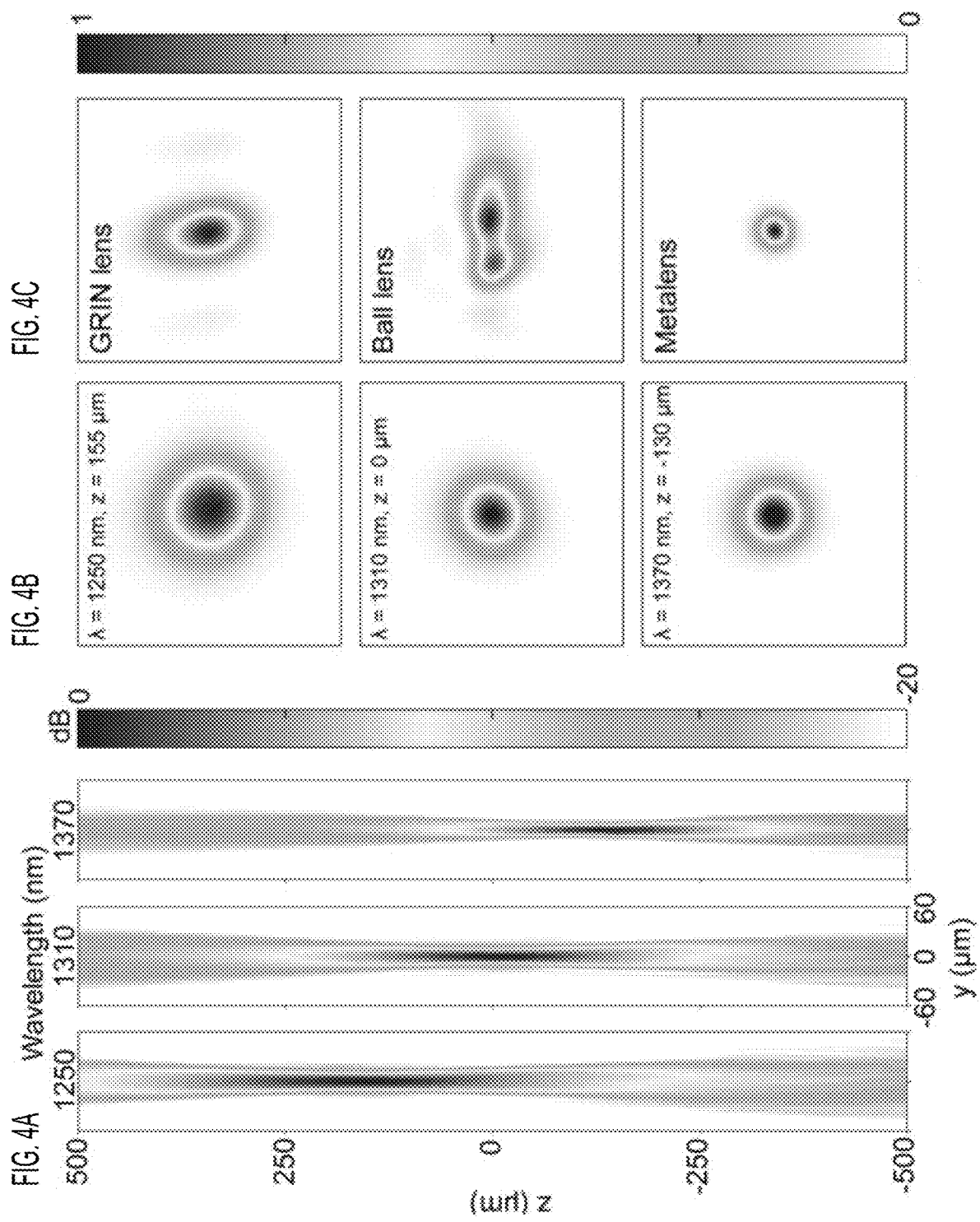
FIG. 4a illustrates a measured intensity distribution of a beam focused by a metalens catheter along a propagation direction in a yz-plane for different wavelengths, according to one or more embodiments of the present disclosure.
FIG. 4b illustrates beam profiles of the metalens catheter at focal points for different wavelengths, according to one or more embodiments of the present disclosure.
FIG. 4c illustrates beam profiles at focal points of a ball lens catheter, a GRIN catheter, and a metalens catheter according to one or more embodiments of the present disclosure.

To assess the metalens catheter performance, a three-dimensional intensity profile of a focusing beam at different wavelengths spanning from about 1250 nm to about 1370 nm (corresponding to the OCT light source wavelength range) can be measured. FIG. 4a illustrates measured intensity distribution of a focusing beam by a metalens catheter along the propagation direction in a yz-plane for different wavelengths ($\lambda$=1250 nm, 1310 nm, and 1370 nm). As shown in FIG. 4a, the metalens catheter output beam profiles are in the tangential plane (corresponding to a region specified with dashed lines in FIG. 2a), indicating no astigmatism.

The focal point axial shift due to wavelength change is observed as shown. FIG. 4b illustrates beam profiles at focal points for 1250 nm, 1310 nm, and 1370 nm wavelengths. Scale bars are 20 µm. Measured focal spots of the metalens in the lateral plane (xy-plane) shown in FIG. 4b have nearly symmetric profiles with 12.7 µm, 8.4 µm, and 7.4 µm full-widths at half-maximum at 1250 nm, 1310 nm, and 1370 nm wavelengths, respectively. Due to the focal point axial shift, metalens NA is higher at longer wavelengths and, consequently, the focal spot becomes smaller. Focal spots are slightly larger than the diffraction-limited values most possibly due to the Gaussian-like field impinging on the metalens (where a uniform field was assumed in the design) and imperfections in the alignment of the components at metalens catheter distal end.

FIG. 4c illustrates beam profiles at focal points of a ball lens catheter, a graded-index GRIN catheter, and the metalens catheter at 1310 nm wavelength. Comparing the focal spot profiles of a GRIN lens catheter and a ball lens catheter with that of the metalens catheter, significantly higher quality output beam of the latter is evident.

Comparative OCT systems use refractive lenses with low NA to illuminate samples with relatively long depth-of-focus. Chromatic dispersion of such focusing elements may be insignificant. Therefore, the spectral interferometry analysis used for reconstruction of scattering amplitudes usually assumes constant illumination beam. In some embodiments, when metalenses are used, the assumption of constant illumination beam may not apply as the chromatic dispersion property follows that of diffractive optics and may be significant. Therefore, the effects of chromatic dispersion of metalens may be considered in the spectral interferometry analysis.

In some embodiments, an analytic approach to spectral interferometry with highly chromatic lenses in the supplementary materials may be used. The analytic lateral point spread function obtained from this analytic approach may assume point scatterers at different depth points. Compared to a design using an achromatic lens, spectral interferometry with a chromatic lens may allow high-resolution imaging beyond the Rayleigh range of the illumination beam. Unlike the case with achromatic lens where best resolution can occur in a fixed interval corresponding to the Rayleigh range of the illumination beam, chromatic lens, due to shifts in the focal length with respect to the wavelength, can maintain higher resolution outside the Rayleigh range of illumination at the center wavelength.

Metalens Catheter Imaging

In some embodiments, a metalens catheter can be connected to the remaining OCT system using a fiber optic rotary joint (FORJ) for endoscopic imaging. In some embodiments, the OCT system may be, for example, a Fourier-domain OCT system including a Mach-Zehnder interferometer driven by a swept-source in the 1310 nm±60 nm wavelength range.

In some embodiments, a fabricated metalens catheter can be used for endoscopic imaging of resected human lungs ex vivo (or in vivo). The fresh human lungs resected from a patient suffering from colon adenocarcinoma metastasized into the lungs were prepared after surgery for imaging. Images of central airways and alveolar structures were captured by inserting the metalens catheter into the lungs transbronchially and through cuts on parenchyma.

Figure 5:
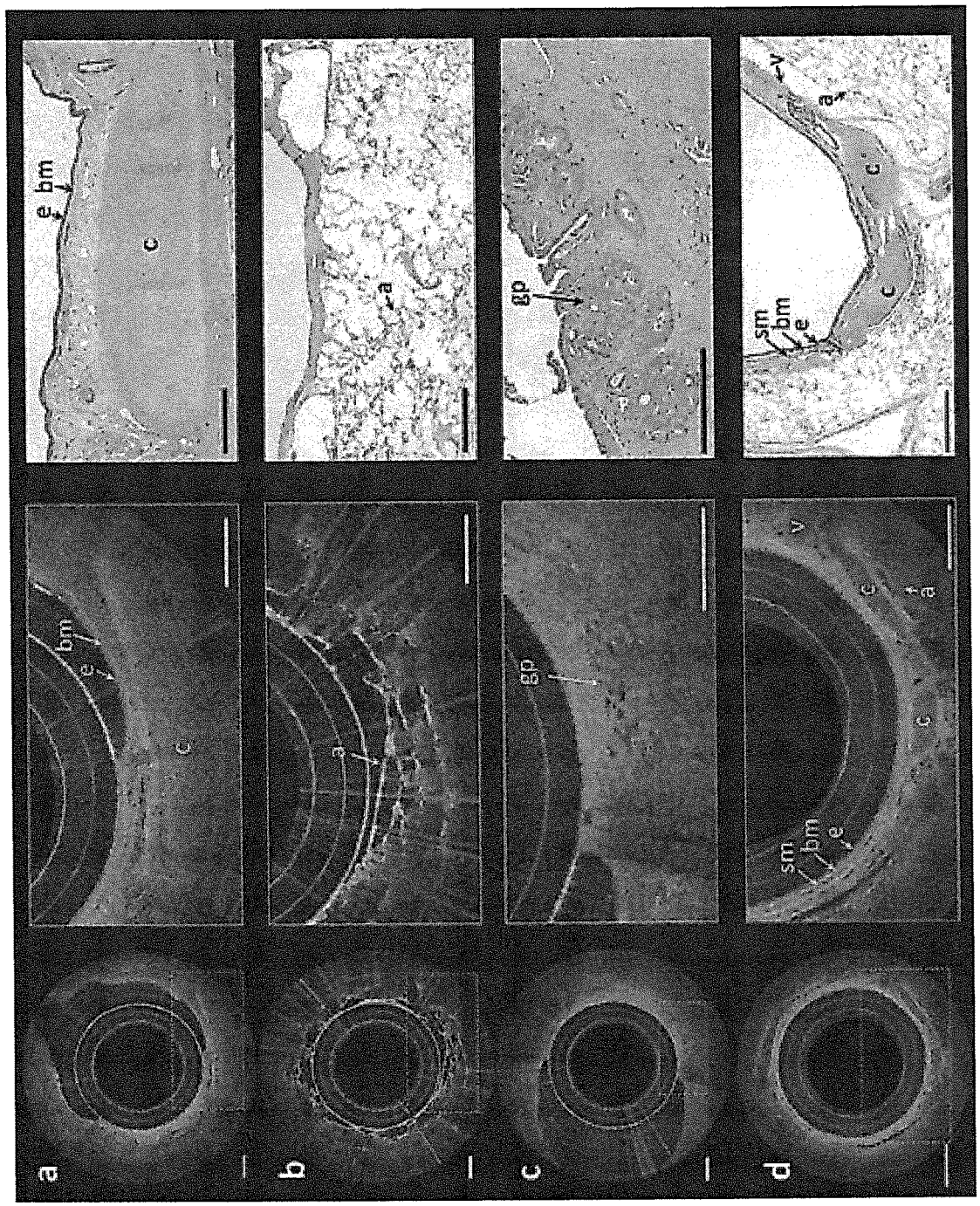
FIG. 5a illustrates an endoscopic image of ex vivo human lungs using a metalens catheter, according to one or more embodiments of the present disclosure.
FIG. 5b illustrates an endoscopic image of ex vivo human lungs using a metalens catheter, according to one or more embodiments of the present disclosure.
FIG. 5c illustrates an endoscopic image of ex vivo human lungs using a metalens catheter, according to one or more embodiments of the present disclosure.
FIG. 5d illustrates a sample image from in vivo endoscopic imaging of a sheep lung model using a metalens catheter, according to one or more embodiments of the present disclosure.

FIGS. 5a, 5b and 5c illustrate endoscopic images of ex vivo human lungs using a metalens catheter. FIG. 5d illustrates a sample image from in vivo endoscopic imaging of a sheep lung model using a metalens catheter. All scale bars are 500 µm. Representative histological images are illustrated in the right column. Lung tissue components including epithelium (e), basement membrane (bm), cartilage (c), blood vessels (v), and alveolar structures (a) are clearly defined in the magnified OCT images in the center column. Fine features such as glandular patterns (gp), the hallmark of adenocarcinoma, can also be discerned.

FIG. 5a shows an image captured from a normal airway in which typical layered lung tissue can be observed. FIG. 5b shows multiple defined layers of small alveolar structures captured through parenchyma. Typically obscure in comparative OCT images are fine glandular patterns, the hallmark of adenocarcinoma, discerned in FIG. 5c.

In some embodiments, a fabricated metalens catheter can be used for endoscopic imaging of a live sheep lung model in vivo. As shown in FIG. 5d, airway tissue components including epithelium, basement membrane, smooth muscle, blood vessel, cartilage, and alveolar structures are observed in the image with high clarity. The metalens catheter allows capturing endoscopic images with recognizable features closer to those obtained using histological evaluations on resected samples.

Endoscopic OCT System Using Metalens Catheter

Figure 6:
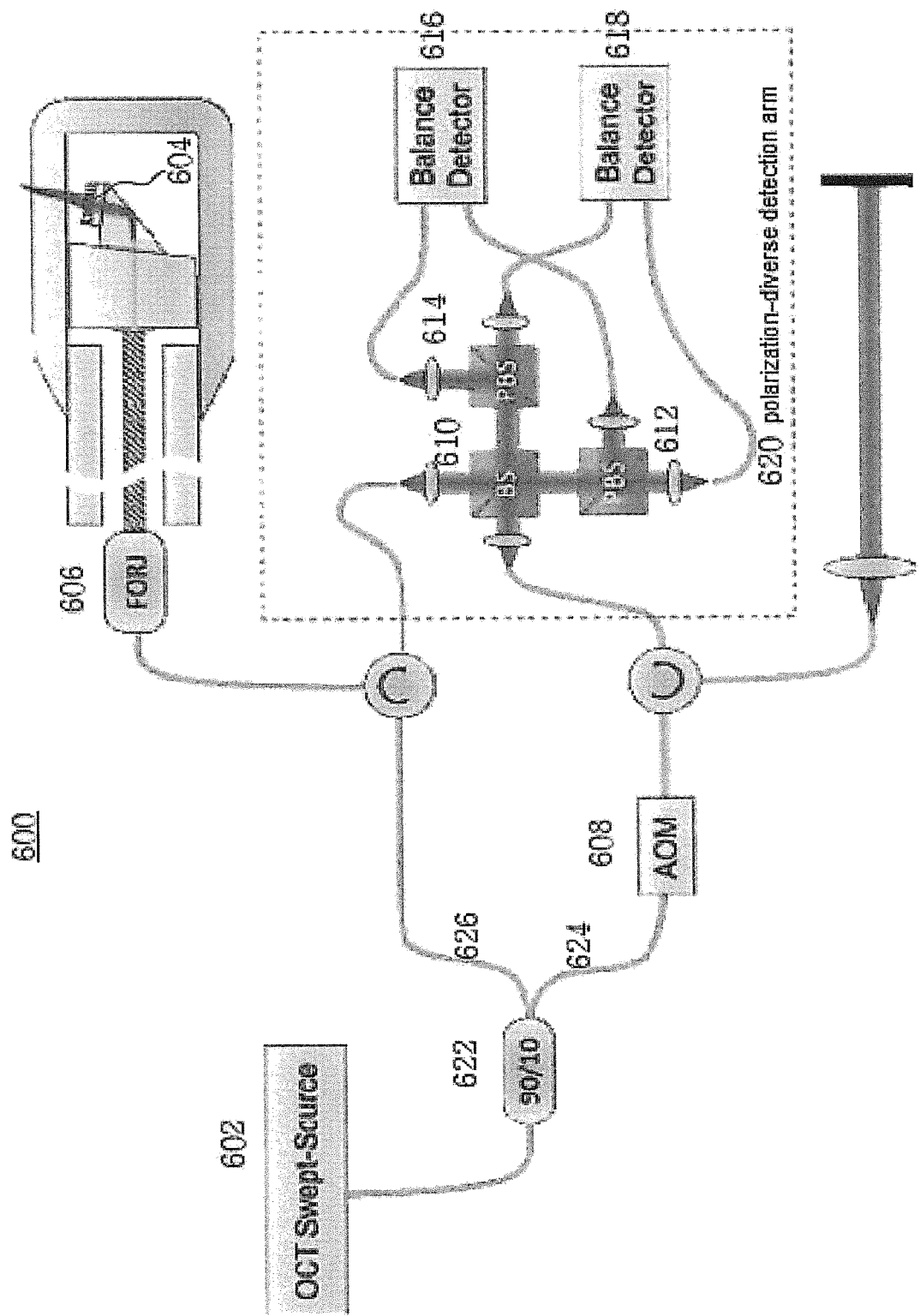
FIG. 6 illustrates an endoscopic OCT system using a metalens catheter, according to one or more embodiments of the present disclosure.

FIG. 6 illustrates an endoscopic OCT system using a metalens catheter. The endoscopic OCT system 600 can be a Fourier-domain OCT system. The endoscopic OCT system 600 includes a swept-source 602, a fiber-based Mach-Zehnder interferometer 622, sample and reference arms 626 and 624, and a polarization-diverse detection arm 620. Metalens catheter 604 is connected to the interferometer 622 by a fiber optic rotary joint (FROJ) 606 that provides rotational and translational motions of the catheter distal optics. An acousto-optic optical modulator (AOM) 608 controls depth degeneracy. The detection arm 620 includes a broadband beam splitter (BS) 610, two polarization beam splitters (PBS) 612 and 614, and two balance detectors 616 and 618.

In some embodiments, endoscopic images are captured using the Fourier-domain OCT system 600 as shown in FIG. 6. The wavelength-swept source 602 (e.g., 1310 nm center wavelength, 120 nm FWHM) includes a semiconductor optical amplifier and a spinning polygon mirror operating at 68 kHz drives the interferometer. The interferometer 622 includes a 90/10 fused fiber coupler that splits the field between the reference arm (10%) and the sample arm (90%). The reference arm 624 contains a fixed reflector and an acousto-optic modulator 608 for shifting the interference signal away from DC. A fraction of the reference arm field is directed to a combination of a fiber Bragg grating (as a narrowband filter) and a fast photodetector to generate synchronizing trigger between wavelength sweeps. In the sample arm 626, a fiber optic rotary joint (FORJ) 606 connects the metalens catheter 604 to the system. Field reflected from the reference mirror recombines with the signal backscattered from the sample in a polarization-diverse detection arm including a broadband beam splitter 610, two polarization beam splitters 612 and 614, and two balanced photodetectors 616 and 618 for detection of two orthogonal polarization components. Electrical output signals of the photodetectors 616 and 618 are digitized using a 14-bit dual channel 170 MS/s data acquisition board. For example, 2248 samples are registered in each wavelength sweep (k-space) and sampled to 2048 8-bit depth pixels after the Fourier transform corresponding to about 9.77 mm ranging depth (in air). With this configuration, the system may achieve 33.2 frames/s imaging with 2048 A-lines/frame.

Data processing to obtain structural OCT images for assessing tissue morphology may include fast Fourier transform (FFT) of the background-subtracted raw data, re-centering and zeroing the negative-portion of the data to remove depth degeneracy, and compensating dispersion and linearizing k-space mathematically. Structural images can be created by taking the square root of squares of two polarization channels.

Polarization Sensitive Optical Endoscopes

Light, being oscillations transverse to the propagation direction, possesses a polarization state that adds an internal degree of freedom to the light properties. This property can be exploited to examine innate structures of materials. One example is using polarization sensitive sensing devices to differentiate tissue structures that have preferred orientation and as a result show birefringence. Examples these tissue structures include tendon, cartilage, and smooth muscles that include fibers mostly oriented in one particular direction. Polarization sensitive optical sensing devices can differentiate these structures from others whose constituents do not possess any preferred orientations. Polarization sensitive optical imaging is employed to determine burn depth, to measure collagen content in atherosclerotic plaques, to identify malignant lesions in the larynx, to detect nerve fiber bundle loss in glaucoma, and to quantify smooth muscle thickening in asthmatic patients.

However, there are difficulties associated with polarization measurements in endoscopic settings. The polarization state of light is not preserved when propagating through the fiber optic core of endoscopes due to the fiber innate birefringence resulting from imperfections to circular symmetry of the core fiber. In addition, in most endoscopic applications fiber movements and flexing are inevitable such as when endoscope deployment entails fiber bending and/or when beam scanning requires fiber rotation. These situations lead to an unstable polarization state of light at the end of the endoscope, hindering reliable and robust polarization sensitive imaging.

Comparative polarization-sensitive endoscopy uses illumination with a sequence of multiplexed polarization states to determine sample birefringence despite unknown polarization state of excitation light. However, the presence of significant polarization mode dispersion in these endoscopic fiber-based optical imaging systems plagues reliable and robust polarization sensing. In addition, optical axis, another important polarization-related metric, cannot be determined with respect to the sample local reference frame and is still ambiguous due to the unknown polarization state of the illumination light. Attempts have been made to remedy this issue using birefringence information of the protective layer in the light path at the distal end of endoscope in cases where the optical axis of this layer is a priori known (e.g., it is known that the layer is a plastic sheath whose optical axis is likely to be oriented in the extrusion direction). However, estimations of the sample optic axis using this method are as accurate as is the assumption of the protective layer having an optic axis oriented in a specific direction. In addition, knowledge of the protective layer's optic axis provides only one known reference coordinate leaving two-fold ambiguity in the estimation of sample's optic axis orientation.

At least some embodiments of the present disclosure overcome difficulties associated with comparative endoscopic polarization-sensitive sensing by using smart fiber optic endoscopes that include polarization-sensitive beam-shaping optics at the distal end that deliver and collect light with controlled and defined polarization state to and from a sample. This technology allows examining polarization properties of the sample with no ambiguity despite the presence of undesired and even varying fiber birefringence.

At least some embodiments of the present disclosure relate to techniques and methods for the design and construction of optical endoscopes using polarization-sensitive optics including nano-structures. These structures allow realization of geometric phase into the wavefront such that light focuses with specific polarization state. Polarization-sensitive optical elements at the distal end of endoscope deliver and collect light with the determinate polarization states to and from the sample that allows sensing the polarization properties of the sample unambiguously. In contrast, certain comparative techniques do not sense the polarization properties due to the unknown polarization states of the excitation and collected light.

Figure 7:
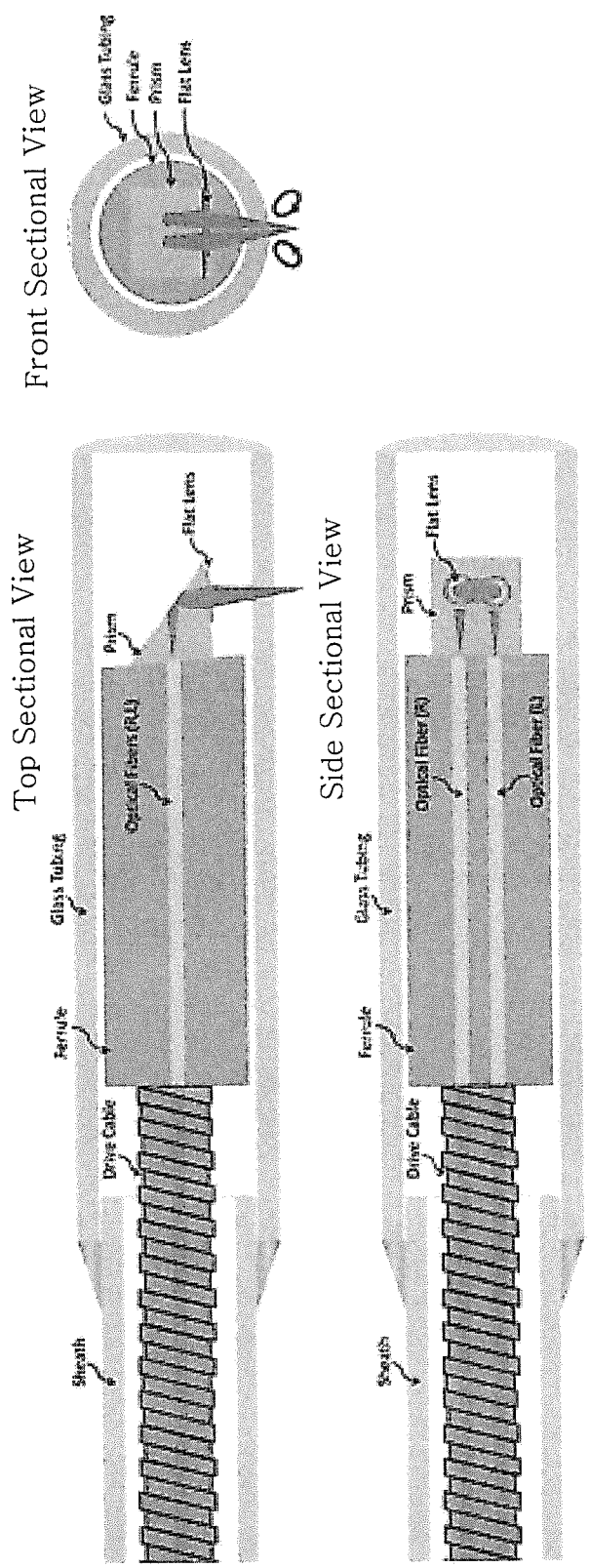
FIG. 7 illustrates a configuration of a distal end of a polarization-sensitive fiber optic endoscope, according to one or more embodiments of the present disclosure.
Figure 8:
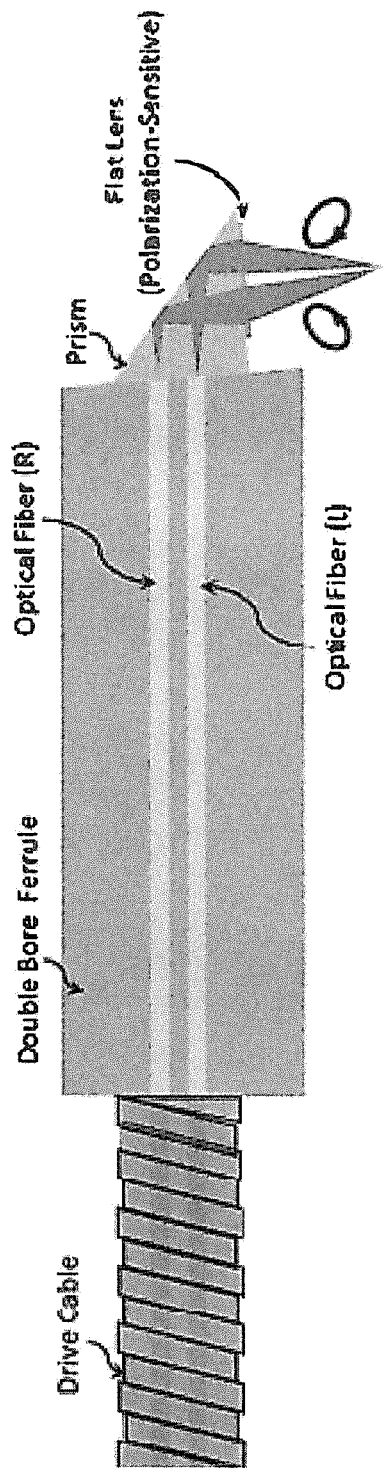
FIG. 8 illustrates another configuration of a distal end of a polarization-sensitive fiber optic endoscope, according to one or more embodiments of the present disclosure.

FIG. 7 illustrates a configuration of a distal end of a polarization-sensitive fiber optic endoscope. FIG. 8 illustrates another configuration of a distal end of a polarization-sensitive fiber optic endoscope. As shown in FIG. 7, light is delivered and collected through two optical fibers housed into a drive cable and a double-bore ferrule. A prism reflects the light to the side of the endoscope suitable for applications that require side-viewing endoscope (for forward-viewing endoscopes, the prism may be omitted). Two polarization-sensitive flat lenses that focus light with specific polarization states excite the sample. In some embodiments, lenses that focus right-handed (R) and left-handed (L) elliptical polarization states may be used. The lenses collect light with the specific polarization states and couple them back to the corresponding fiber channels (R, L).

Polarization-sensitive light focusing can be accomplished using geometric phase (e.g., Pancharatnam-Berry phase) introduced through local change of light polarization state. A sequence of transformations in the polarization state of light may result in a net phase shift that depends only on the path of the system evolution in the polarization state space (Poincaré Sphere). Polarization-sensitive lenses based on geometric phase can be applied to, for example, a far infrared range, an infrared range, and a visible range.

Figure 9:
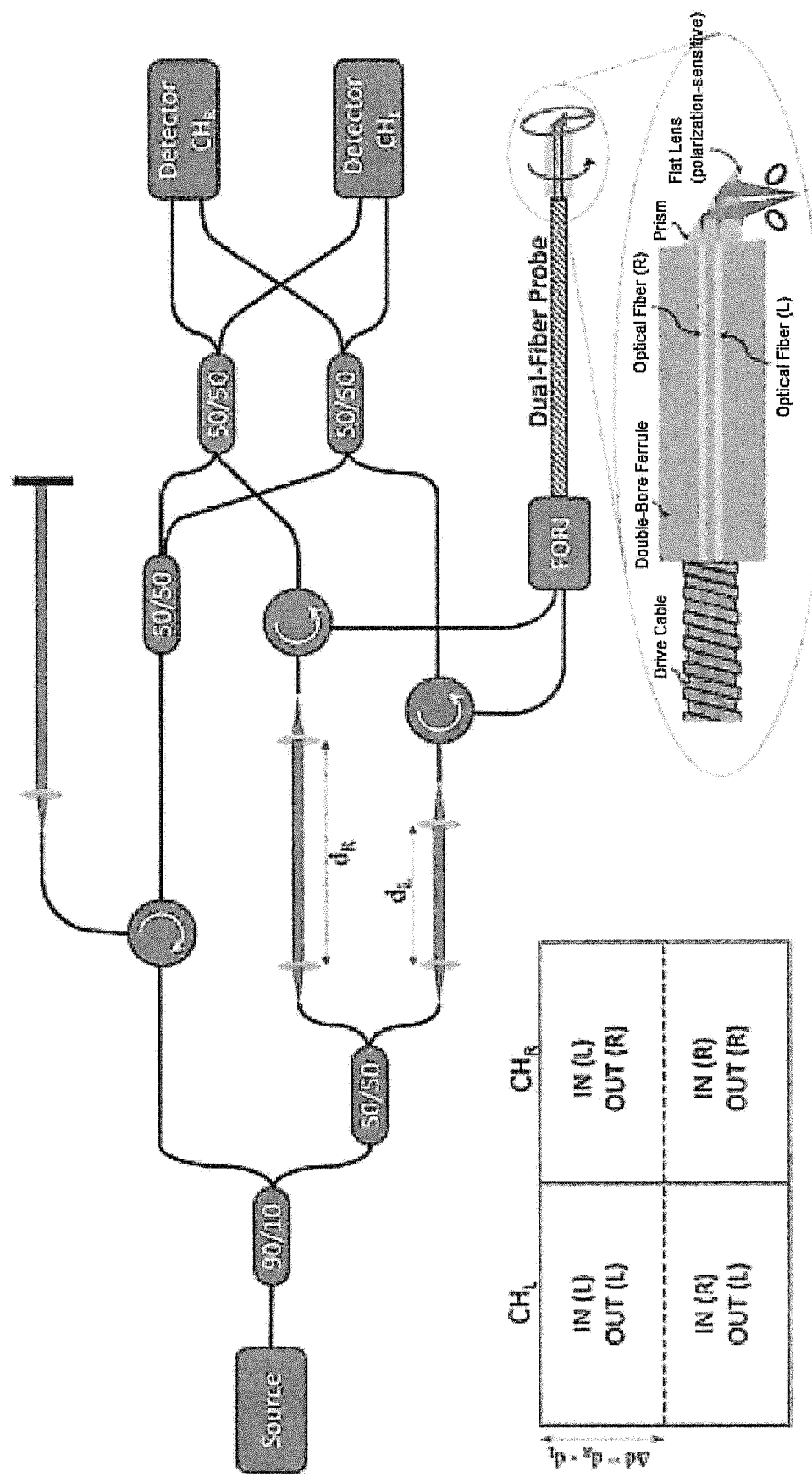
FIG. 9 illustrates a polarization-sensitive optical coherence tomography system including a polarization-sensitive fiber optic endoscope, according to one or more embodiments of the present disclosure.

FIG. 9 illustrates a polarization-sensitive optical coherence tomography system including a polarization-sensitive fiber optic endoscope. The tomography system 900 includes a dual-channel Mach-Zehnder interferometer. Different delays are introduced in the optical paths of the two fiber channels that illuminate the sample, leading to two images offset with respect to each other for each channel. As a result, four images are created corresponding to all four combinations of input/output with two orthogonal polarization states, allowing calculation of Jones matrices and/or Stokes parameters of the sample structures unambiguously. Although the embodiments illustrated in FIG. 9 uses optical path delays to isolate images with different input polarization states, other multiplexing techniques such as acousto-optic frequency shifting may be used as well.

In some embodiments, the disclosed systems for endoscopic polarization-sensitive optical sensing can have various applications in different fields, particularly for high resolution endoscopes that can examine tissue with different polarization states. For example, the disclosed endoscopic polarization-sensitive optical sensing technology can be used for detection smooth muscle in the lung. The thickness of smooth muscle layers may be correlated with pathological grades in common lung diseases such as asthma and chronic obstructive pulmonary disease (COPD). Thus, an imaging system that visualizes smooth muscles can significantly contribute in the detection and study of these diseases.

In some embodiments, a metalens includes a substrate and multiple nanostructures disposed on the substrate, where the nanostructures together specify a phase profile of the metalens.

In some embodiments, a cross-section of at least one nanostructure is circular, elliptical, rectangular, or other polygonal or non-polygonal shape.

In some embodiments, the phase profile is achieved by varying geometric dimensions of the nanostructures (e.g., varying diameters).

In some embodiments, the nanostructures include a dielectric material. Examples of suitable dielectric materials include metal and non-metal oxides (such as an oxide of aluminum (e.g., $Al_2O_3$), silicon (e.g., $SiO_2$), hafnium (e.g., $HfO_2$), zinc (e.g., ZnO), magnesium (e.g., MgO), or titanium (e.g., $TiO_2$)), metal and non-metal nitrides (such as nitrides of silicon (e.g., $Si_3N_4$), boron (e.g., BN), or tungsten (e.g., WN)), metal and non-metal sulfides, and pure elements (e.g., silicon or amorphous silicon). In some embodiments, the substrate is a glass substrate or another substrate including a suitable dielectric material as listed above. In some embodiments, the nanostructures have aspect ratios (e.g., height:width or height:diameter) greater than about one, such as at least about 1.5:1, at least about 2:1, at least about 3:1, at least about 4:1, or at least about 5:1, and up to about 10:1 or greater, or up to about 20:1 or greater.

It is to be understood that the term "design" or "designed" (e.g., as used in "design wavelength," "design focal length" or other similar phrases disclosed herein) refers to parameters set during a design phase; which parameters after fabrication may have an associated tolerance.

As used herein, the singular terms "a," "an," and "the" may include plural referents unless the context clearly dictates otherwise.

Spatial descriptions, such as "above," "below," "up," "left," "right," "down," "top," "bottom," "vertical," "horizontal," "side," "higher," "lower," "upper," "over," "under," and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same if a difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. An endoscopic imaging device, comprising:
a light-transmitting tubing;
at least one optical fiber disposed in the light-transmitting tubing; and
at least one metalens optically coupled to the optical fiber and configured to:
receive light from the optical fiber;
transmit the light through the at least one metalens; and
focus the light from the optical fiber, through the light-transmitting tubing, and to a target point located outside of the light-transmitting tubing;
wherein the metalens includes a plurality of nanostructures, and the nanostructures define a phase profile that corrects one or more aberrations including astigmatism caused by the light-transmitting tubing;
wherein the phase profile corrects the one or more aberrations by focusing the light from the optical fiber to a diffraction-limited spot; and
wherein the phase profile, $\varphi$, is a function of $L_{sl}$ which is an optical path length between a facet of the optical fiber and the metalens, $L_{lf}$ which is an optical path length between the metalens and a focal point of the metalens, and $L_{chief}$ which is an optical path length of a chief ray.

2. The endoscopic imaging device of claim 1, wherein the metalens is further configured to collect light from the target point outside of the light-transmitting tubing, through the light-transmitting tubing, and to the optical fiber.

3. The endoscopic imaging device of claim 1, wherein the phase profile of the nanostructures corrects one or more aberrations including astigmatism caused by tubing curvatures of the light-transmitting tubing parallel or perpendicular to a catheter axis.

4. The endoscopic imaging device of claim 1, wherein the phase profile of the nanostructures compensates length differences between a shortest optical path between the target point and the focal point of the metalens and an optical path between the target point and the focal point of the metalens.

5. The endoscopic imaging device of claim 1, further comprising a prism optically coupling the metalens to the optical fiber.

6. The endoscopic imaging device of claim 1, wherein the nanostructures comprise amorphous silicon nanopillars having an azimuthal symmetry.

7. The endoscopic imaging device of claim 1, wherein the nanostructures have a common height and various diameters and the phase profile depends on the diameters of the nanostructures.

8. The endoscopic imaging device of claim 1, wherein the nanostructures have a common height and various bases and the phase profile depends on the geometry of the nanostructures.

9. The endoscopic imaging device of claim 1, wherein the metalens is configured to output light with a specific polarization state.

10. The endoscopic imaging device of claim 1, wherein the metalens is configured to collect light with a specific polarization state.

11. The endoscopic imaging device of claim 1, wherein the endoscopic imaging device is a catheter of an endoscopic optical coherence tomography system, a confocal endomicroscope, or a two-photon imaging endoscope.

12. The endoscopic imaging device of claim 1, wherein the endoscopic imaging device is configured to extend an imaging depth-of-focus by modifying metalens dispersion.

13. An endoscopic imaging system, comprising:
an interferometer;
a detection unit coupled to the interferometer;
a catheter coupled to the interferometer, the catheter comprising:
a light-transmitting tubing;
an optical fiber disposed in the light-transmitting tubing; and
a metalens optically coupled to the optical fiber and configured to:
receive light from the optical fiber;
transmit the light through the metalens; and
focus the light from the optical fiber, through the light-transmitting tubing, and to a target point located outside of the light-transmitting tubing;
wherein the metalens includes a plurality of nanostructures, and the nanostructures define a phase profile that corrects astigmatism caused by the light-transmitting tubing;
wherein the phase profile corrects one or more aberrations by focusing the light from the optical fiber to a diffraction-limited spot; and
wherein the phase profile, $\varphi$, is a function of $L_{sl}$ which is an optical path length between a facet of the optical fiber and the metalens, $L_{lf}$ which is an optical path length between the metalens and a focal point of the metalens, and $L_{chief}$ which is an optical path length of a chief ray.

14. The endoscopic imaging system of claim 13, wherein the phase profile of the nanostructures corrects astigmatism caused by tubing curvatures of the light-transmitting tubing parallel or perpendicular to a catheter axis.

15. The endoscopic imaging system of claim 13, wherein the nanostructures comprise amorphous silicon nanopillars, and the phase profile depends on various diameters of the nanopillars.

16. The endoscopic imaging system of claim 13, further comprising a fiber optic rotary joint coupling the catheter to the interferometer, the fiber optic rotary joint configured to control rotational and translational motions of the catheter.

17. The endoscopic imaging system of claim 13, further comprising an acousto-optic optical modulator configured to control a depth degeneracy of the catheter.

18. The endoscopic imaging system of claim 13, wherein the detection unit comprises at least one beam splitter and at least one balance detector.

19. The endoscopic imaging system of claim 13, further comprising a wavelength-swept source coupled to the interferometer.

20. A polarization-sensitive optic endoscopic system, comprising:
a first optical fiber;
a second optical fiber; and
a catheter coupled to the first optical fiber and the second optical fiber, the catheter comprising:
 a light-transmitting tubing, wherein a portion of the first optical fiber and a portion of the second optical fiber are disposed in the light-transmitting tubing;
 a first metalens optically coupled to the first optical fiber and configured to focus light of a first polarization state from the first optical fiber and to a target point located outside of the light-transmitting tubing; and
 a second metalens optically coupled to the second optical fiber and configured to focus light of a second polarization state from the second optical fiber and to the target point located outside of the light-transmitting tubing,
wherein the first metalens includes a plurality of first nanostructures, and the first nanostructures define a phase profile that focuses the light of the first polarization state to the target point;
wherein the phase profile corrects one or more aberrations by focusing the light from the first optical fiber to a diffraction-limited spot; and
wherein the phase profile, $\varphi$, is a function of $L_{sl}$ which is an optical path length between a facet of the first optical fiber and the first metalens, $L_{lf}$ which is an optical path length between the first metalens and a focal point of the metalens, and $L_{chief}$ which is an optical path length of a chief ray; and
wherein the second metalens includes a plurality of second nanostructures, and the second nanostructures define a phase profile that focuses the light of the second polarization state to the target point.

21. The polarization-sensitive optic endoscopic system of claim 20, further comprising a multiple-channel interferometer configured to introduce optical path delays for multiple channels.

22. The polarization-sensitive optic endoscopic system of claim 20, further comprising a frequency shifting component configured to provide acousto-optic frequency shifts for multiple channels.

23. The polarization-sensitive optic endoscopic system of claim 20, wherein the first metalens is further configured to collect light of the first polarization state from the target point outside of the light-transmitting tubing and to the first optical fiber.

24. The polarization-sensitive optic endoscopic system of claim 20, wherein the second metalens is further configured to collect light of the second polarization state from the target point outside of the light-transmitting tubing and to the second optical fiber.

25. The polarization-sensitive optic endoscopic system of claim 20, wherein the first polarization state is a right-handed elliptical polarization state, and the second polarization state is a left-handed elliptical polarization state.

* * * * *